May 14, 1929.　　　S. A. STRANAHAN　　　1,712,943

SINGLE PLATE CLUTCH

Filed July 31, 1926

Inventor
Samuel A. Stranahan

By Blackmore, Spencer & Hulit
Attorneys

Patented May 14, 1929.

1,712,943

UNITED STATES PATENT OFFICE.

SAMUEL A. STRANAHAN, OF FLINT, MICHIGAN, ASSIGNOR TO GENERAL MOTORS CORPORATION, OF DETROIT, MICHIGAN, A CORPORATION OF DELAWARE.

SINGLE-PLATE CLUTCH.

Application filed July 31, 1926. Serial No. 126,193.

This invention relates to new and useful improvements in friction clutches of the single plate type, and more particularly to the construction and arrangement of a clutch release yoke to minimize end thrust due to the resistance of the engaging springs, and eliminate the customary reducing levers. The clutch is particularly adaptable for use in connection with an explosive engine for propelling automobiles, but obviously is not limited to such use alone.

In the common form of single plate clutch, driving contact is made thru axial spring pressure, which is necessarily high to insure positive connection. This pressure offers quite a degree of resistance to the manual control of the clutch thru the customary foot pedal, and places considerable end thrust on the clutch shaft. It has been the practice to employ three or more reducing levers in the clutch to relieve the pressure, but it is difficult to maintain these reducing levers in proper adjustment and since they revolve with the clutch are apt to rattle and become noisy.

An object of the present invention is to eliminate the necessity for revoluble reducing levers by connecting the pressure plate to a single operating lever in such manner that friction and consequent wear is reduced to a minimum and but slight manual effort will be required to control the clutch operation.

Figure 1:
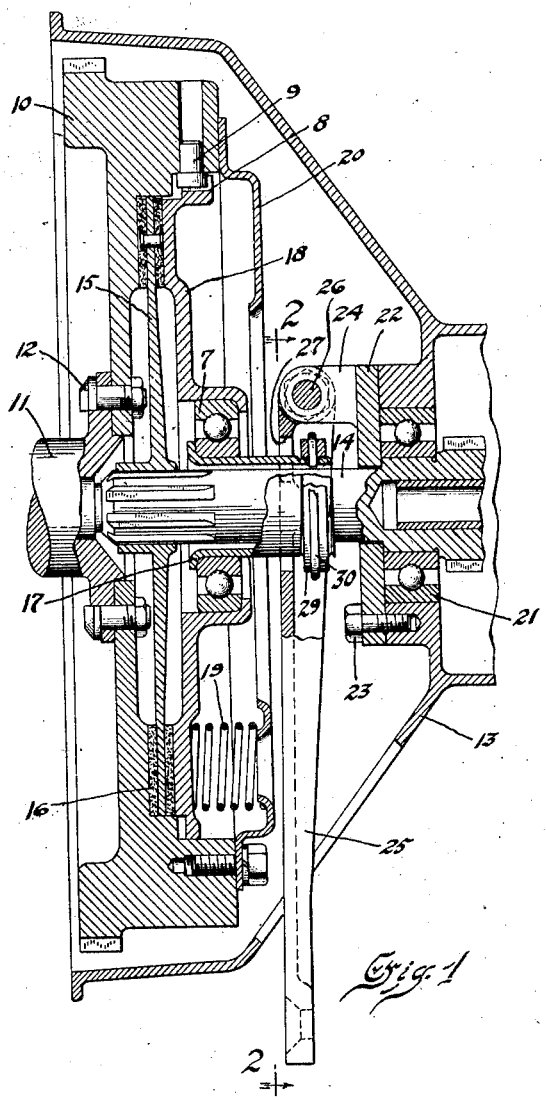
Figure 1 is a sectional view of a single plate clutch mechanism illustrating the arrangement of parts in accordance with the present invention.
Figure 2:
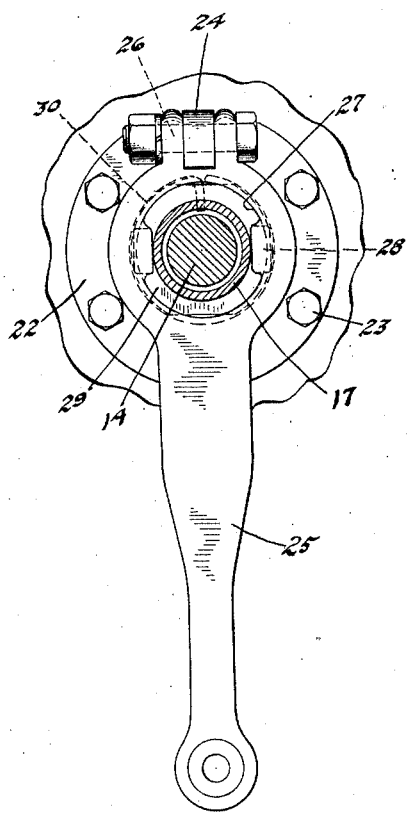
Figure 2 is a transverse sectional view taken on line 2—2 of Figure 1.

The numeral 13 refers to the bell shaped housing carried by the crank-case of an explosive engine, to enclose the flywheel 10 secured to an end flange on the crankshaft 11 by bolts 12, and also the clutch mechanism. The transmission housing is shown as formed integrally with the flywheel housing 13, being broken away at the right of Figure 1. Mounted in the end of the flywheel housing 13 is the ball bearing 21 for a clutch shaft 14, which shaft is formed with a reduced end, piloted in a central bore in the end of the crankshaft 11. Splined to the clutch shaft 14 for revoluble movement therewith is the driven plate or disc 15, with suitable friction rings 16 secured thereto for contact respectively with the flywheel 10 and a pressure or thrust plate 18, keyed to the flywheel, as by means of a series of grooves in its periphery as at 8 and the studs 9 on the flywheel. The plate 20, bolted to the flywheel provides seats for the pressure springs 19 which exert their force against the thrust plate 18 to maintain clutch engagement. A sleeve 17 surrounds the shaft 14 and has engagement with the thrust plate 18 by means of a friction reducing bearing 7. An adjustable screw threaded collar 29 is carried at the end of the sleeve 17 and is locked in position by means of a C-spring 30 seating in a peripheral groove in the collar and having its extremity projecting thru registering holes in the collar and sleeve. The clutch release yoke 25 has an opening 27 surrounding the sleeve, and a pair of opposite inwardly projecting lugs or ears 28 engaging with the collars 29. Pivotal ears are provided for the yoke 25, and a bolt 26 passes thru the ears and a lug 24 carried upon the plate 22, secured to the housing 13, preferably by means of a number of screw threaded studs 23. In addition to forming a mounting for the lug 24, the plate 22 serves to retain the bearing member 21 for the clutch shaft, in proper position. The yoke lever 25 projects thru the housing 13 and may be connected at its end in any suitable manner to a foot pedal. It will be noted that the fulcrum point is closely adjacent the load while the yoke has quite a long leverage.

To disengage the clutch, the outer end of the yoke is drawn rearwardly, so that the ears 28 engage the collar 29 to move the sleeve 17 longitudinally, carrying with it the thrust plate 18, against the tension of the pressure springs 19. As the plate 18 compresses the springs the frictional contact is broken and the clutch disc 15 is relieved of engine driving power.

Thus the clutch release yoke reduces the load at the foot pedal or other manually controlled lever, obviating the necessity of revoluble reducing levers and eliminates the objectionable end pressure on the shaft.

While the construction has been described more or less specifically, there is no intention to limit the invention to the particular details, but obvious modifications may be made such as come within the scope of the appended claims.

I claim:

1. In combination, a driving element, a driven element, a clutch to transmit motion from the driving to the driven element, including a thrust plate, pressure springs adapted to act on said thrust plate to maintain driving engagement, a longitudinally movable sleeve on which said thrust plate is mounted for free relative rotation, an adjustable collar on said sleeve, means to hold said collar in adjusted position, a housing for the clutch, an anti-friction bearing carried by the housing for the driven element, a retainer element for said bearing, and an operating lever pivoted to said retainer element having an opening surrounding the sleeve and bearing surfaces engaging said collar, whereby the operation of the lever overcomes spring pressure and disengages the clutch.

2. In combination, a driving element, a driven element, a clutch to transmit motion from the driving to the driven element, including a thrust plate, yielding tension means bearing on the plate for maintaining frictional driving contact, a longitudinally movable sleeve co-operating with said thrust plate, an adjustable collar on said sleeve, means to lock the collar in its adjusted position, a housing for the clutch, a friction reducing bearing mounted in said housing for the driven element, a retainer plate for said bearing, and an operating lever pivoted to said plate at a point adjacent the axis of the sleeve and extending to a point removed from the housing, having an opening surrounding the sleeve and a pair of oppositely disposed ears engaging said collar, whereby the operation of the lever controls the frictional driving contact.

3. In a friction clutch, a pair of driving discs, a driven disc between said driving discs, yielding tension means exerting force against one of the driving discs to maintain driving contact between the discs, a longitudinally movable sleeve operatively connected with the tensioned disc, an adjustable collar on said sleeve, a C-spring carried by the collar, an extremity of which is adapted to extend thru the collar and sleeve to lock the sleeve in adjusted position, a casing for the discs, an operating yoke surrounding the sleeve, having abutment surfaces to engage said collar, one end of the yoke being pivoted to said casing close to the sleeve while the opposite end projects thru the casing to a point removed a considerable distance from the sleeve, enabling a comparatively small effort exerted on the yoke to overcome the yielding tension means.

4. In combination, a driving element, a driven element, a clutch to transmit motion from the driving to the driven element, including a longitudinally movable sleeve surrounding the driven element, a thrust plate revolubly carried by the sleeve, spring tension means acting on said plate for yieldingly maintaining clutch engagement, an adjustable thrust collar on said sleeve means to hold the collar in adjusted position, a housing for the clutch, a bearing in said housing for the driven element, a retainer plate for said bearing, and a control lever pivotally mounted on said retainer plate for engagement with the thrust collar to disengage the clutch against spring tension.

In testimony whereof I affix my signature.

SAMUEL A. STRANAHAN.